INVENTORS
GORDON ALAN HUGHES
HERCHEL SMITH
BY Vito Victor Bellino
ATTORNEY

United States Patent Office 3,467,652
Patented Sept. 16, 1969

3,467,652
SYNTHESIS OF GONANE DERIVATIVES
Gordon Alan Hughes, Haverford, Pa., and Herchel Smith,
500 Chestnut Lane, Wayne, Pa. 19087; said Hughes
assignor to said Smith
Continuation-in-part of application Ser. No. 228,384,
Oct. 4, 1962. This application Mar. 25, 1966, Ser.
No. 537,432
Int. Cl. C07c *169/36, 169/10;* A61k *27/00*
U.S. Cl. 260—239.55                                15 Claims

ABSTRACT OF THE DISCLOSURE

The synthesis of novel 13-polycarbon-alkyl compounds having a saturated gonane nucleus is described. These compounds have qualitatively varying biological effects in animals, particularly estrogenic, androgenic, antiandrogenic, myotrophic, blood lipid, and central nervous system effects. Additionally, they are useful as intermediates for the preparation of other gonanes possessing hormonal properties.

---

This application is a continuation-in-part of co-pending application Ser. No. 228,384 filed Oct. 4, 1962.

This invention relates to compositions of matter classified in the art of chemistry as substituted gonane derivatives, to intermediates therefor, and to processes for making and using such compositions. The term "gonane" where used in this specification indicates that the hydrogen atom at the 5-position is attached in the α-configuration, unless otherwise specified.

In describing the invention, reference will be made in the following specification to the annexed drawings wherein.

Figure 1:
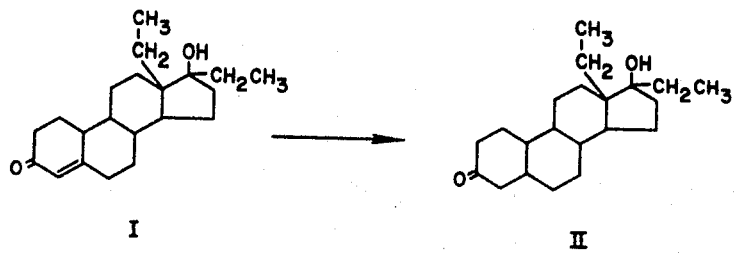
FIGURE 1 illustrates schematically the reduction of a 13-polycarbonalkylgon-4-en-3-one to prepare a 13-polycarbonalkylgonan-3-one, specifically the conversion of 13β,17α-diethyl-17-hydroxygon-4-en-3-one to 13β,17α-diethyl-17-hydroxygonan-3-one.

The invention sought to be patented, in a principal composition aspect, is described as residing in the concept of a chemical compound having a saturated gonane nucleus and having attached thereto in the 13-position, a monovalent polycarbon-alkyl radical.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. For example, the characteristic ultraviolet absorption at about 240 mμ of the starting materials has disappeared in the product; and the infrared absorption at about 6.0μ of the starting gon-4-en-3-ones shifts to about 5.85μ in the final compounds. The aforementioned physical characteristics, taken together with the nature of the starting materials and the mode of synthesis, confirm the structure of the compositions sought to be patented.

The tangible embodiments of the invention possess the inherent use characteristics of exerting qualitatively varying biological effects in animals as evidenced by pharmacological evaluation according to standard test procedures. Such tangible embodiments show estrogenic, androgenic, antiandrogenic, myotrophic, blood lipid effects, and central nervous system effects. This finding indicates their usefulness in the treatment of female hypogonadism, amenorrhea, dysmenorrhea, ovulation block and contraception, functional uterine bleeding, acne, arteriosclerosis, osteoporosis, hormone dependent tumors, infertility, growth inhibition, and anesthesia. In particular it has been established that alternations of the natural steroid structure made possible by our discovery result not merely in a change of degree of hormonal activity but, as a result of the separation of types of horizontal activity, alter in an unexpected way its basic nature so that a desirable hormone effect is maximized and an undesirable hormone effect is minimized.

In addition to their inherent applied use characteristics, the intermediate compositions of this invention are useful in practicing the process aspect of the present invention in the making of the principal gonane compositions of the invention according to the sequence of reactions described herein.

The invention sought to be patented, in a principal process of making the compositions aspect, is described as residing in the concept of hydrogenating the 4(5) double bond of a gon-4-ene having attached thereto in the 13-position a polycarbon-alkyl radical to obtain a gonane having attached thereto in the 13-position a polycarbon-alkyl radical.

The invention sought to be patented in a subgeneric composition aspect is described as residing in the concept of a 13-polycarbonalkyl-17-acyloxyacetyl-5β-gonan-3-one, of which a specific embodiment, 13β-ethyl-17β-hemisuccinoyloxyacetyl-5β-gonan-3-one, is hereinafter described.

The tangible embodiments of said subgeneric composition aspect possess the use characteristic of varying biological effects in animals as evidenced by pharmacological evaluation by standard test procedures.

The invention sought to be patented in a second process aspect is described as residing in the concept of reducing a 13-polycarbonalkylgon-4-en-3-one by means of an alkali metal reduction in liquid ammonia to obtain a 13-polycarbonalkylgonane compound.

The manner of making the chemical compounds which are starting materials for use in making the compounds of the invention, and for use in the processes of making the invention, are illustrated in co-pending application Ser. No. 228,384 filed Oct. 4, 1962.

The manner and process of making and using the invention will now be generally described so as to enable a person skilled in the art of chemistry to make and use same, as follows:

Referring now to FIGURE 1, wherein the compounds are assigned Roman numerals for identification schematically, the reaction involved in the synthesis of a specific embodiment, namely 13β,17α-diethyl-17β-hydroxygonan-3-one is illustrated. 13β,17α-diethyl-17β-hydroxygon-4-en-3-one, dissolved in a mixture of ether and dioxan is added to a solution of lithium and liquid ammonia and, after stirring for a suitable time, is decomposed with ammonium chloride to obtain 13β,17α-diethyl-17β-hydroxygonan-3-one.

Alternatively, 13β-17α-diethyl - 17β - hydroxygon-4-en-3-one is dissolved in ethanol containing aqueous potassium hydroxide and the solution shaken with 10% palladized charcoal in an atmosphere of hydrogen to give 13β,17α-diethyl-17β-hydroxy-5β-gonan-3-one.

Figure 2:
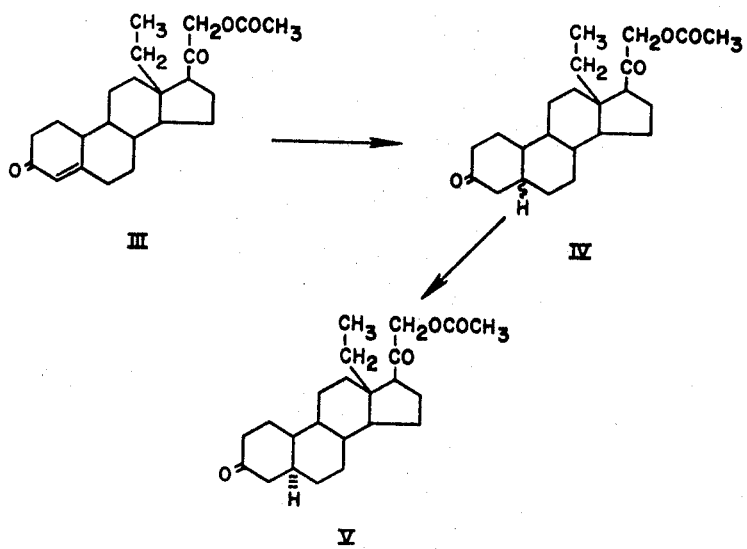
FIGURE 2 illustrates schematically the hydrogenation of a 13-polycarbonalkylgon-4-en-3-one to prepare an isomeric mixture of 13-polycarbonalkylgonan-3-ones, and separation of the 13-polycarbonalkylgonan-3-one, specifically the conversion of 13β-ethyl-17β-acetoxyacetylgon-4-en-3-one to 13β-ethyl-17β-acetoxyacetylgonan-3-one.

Referring now to FIGURE 2, wherein the compounds are assigned Roman numerals for identification schematically, the reaction involved in the synthesis of 13β-ethyl-17β-acetoxyacetylgonan-3-one is illustrated. 13β-ethyl-17β-acetoxyacetylgon-4-en-3-one (III) is dissolved in ethanol and shaken with 2% palladized calcium carbonate in an atmosphere of hydrogen to give a mixture of the corresponding gonan-3-one together with the 5β-gonan-3-one (IV). This mixture is then separated by chromatography on neutral alumina to furnish 13β-ethyl-17β-acetoxyacetylgonan-3-one (V).

The starting gon-4-en-3-ones are prepared by Birch reduction of the corresponding 3-alkoxygona-1,3,5(10)-trienes or 3-alkoxygona-1,3,5(10) - 8 - tetraenes followed by acid hydrolysis of the 3-alkoxygona-2,5(10)-diene so formed. The substituent at the 17-position can be present initially, or inserted by methods known in the art at any stage during the synthesis i.e. after Birch reduction and hydrolysis, or after removal of the 4(5) bond. Thus a 3-alkoxy - 17 - carboxygona-1,3,5(10)-triene can be converted to a 17-carboxygon-4-en-3-one, the 17-carboxy group then transformed into a 17-acetoxyacetyl group by reaction of the acid chloride with diazomethane followed by treatment with acetic acid, and then the 17-acetoxyacetylgon-4-en-3-one reduced to the corresponding gonan-3-one.

The 17-acetoxyacetyl group of either a gon-4-en-3-one or a gonan-3-one can be hydrolyzed to the corresponding 17-hydroxyacetyl group, and the hydroxy group so formed can then be etherified and esterified as, for example with dihydropyran to form a tetrahydropyranyloxyacetyl group or with succinic anhydride to form a hemisuccinoyloxy-acetyl group. The gon-4-en-3-ones are then converted to the gonan-3-ones or 5β-gonan-3-ones by processes described hereinbefore and in the examples.

For the processes of the invention, and except for the limitations expressed in this specification, variations of the substituents at the 17-position of the gonanes or 5β-gonanes, or on the intermediates leading thereto, are full equivalents of each other.

When the starting materials possess further substituents on the A-ring at positions 1, 2, or 4, such as methyl or halo, these substituents will lead to the correspondingly substituted gonanes and 5β-gonanes of the invention. Further, substituents can be introduced on to the A-ring of the A-ring unsubstituted compounds of the invention, as, for example, by alkylation or halogenation of a gonan-3-one or 5β-gonan 3-one.

For the processes of the invention, and except for the limitations expressed in this specification, variations on the A-ring of the gonanes or 5β-gonanes, or on the intermediates leading thereto, are full equivalents of each other.

Similarly, when the starting materials possess further substituents on the B-ring at positions 6 or 7, these substituents will lead to the correspondingly substituted gonanes and 5β-gonanes of the invention.

For the processes of the invention, and except for the limitations expressed in this specification, variations on the B-ring of the gonanes or 5β-gonanes, or on the intermediates leading thereto, are full equivalents of each other.

The specific reactions involved in the processes of the invention will now be considered, as follows, reference being made to the drawings for typifying compounds:

The gonenones (I) can be reduced with an alkali metal in liquid ammonia. Calcium can also be used for this reduction. The product will normally be the gonan-3-one, sometimes formed in admixture with the 5β-gonan-3-one. A dissolving alkali metal in a lower alkanol, preferably in the presence of liquid ammonia, can also be used in this reduction, and the product will then be the gonan-3-ol.

The 3-ketone of the gonenones (I) can also be reduced before reduction of the 4(5) bond. Thus a hydride transfer agent such as lithium aluminum hydride will reduce the gonenone to a gon-4-en-3-ol. The 3-ketone can be reduced to methylene by thioketal formation, followed by cleavage with an alkali metal in liquid ammonia to produce a gon-4-ene. In both cases the 4(5) bond can then be removed by hydrogenation to produce the gonane, generally in admixture with the 5β-gonane.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph. When resolved starting materials are used, by applying the manipulative procedures described herein, the corresponding enantiomorph is obtained.

A pharmaceutical preparation for use as an intravenous anesthetic consists of a 1% aqueous solution of 13β-ethyl-17β-hemisuccinoyloxyacetyl-5β-gonan - 3 - one, sodium salt.

Pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet-disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth methyl cellulose, sodium carboxymethylcellulose, a low melting wax, and cocoa butter. The term "preparation" is intended to include the formulation of the compound with encapsulating material as carrier providing a capsule in which the compound (with or without other carriers) is surrounded by carrier, which is thus in association with it. Similarly, catchets are included. Tablets, powders, cachets, and capsules can be used for oral adminstration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspension suitable for oral use can be made by dispensing the finely divided compound in water with viscous material, natural or synthetic gums, resins, etc., for example, gum arabic, ion-exchange resins, methylcellulose, sodium carboxymethylcellulose and other well-known suspending agents.

Preferably the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules. The unit dosage form can be a capsule, cachet, or tablet itself, or it can be the appropriate number of any of these in packaged form. The quantity of compound in a unit dose of preparation may be varied or adjusted from 1 mg. to 100 mg. (generally with the range of 2.5 to 25 mg.) according to the particular application and the potency of the active ingredient.

The claimed compositions having physiological activity can be incorporated into pharmaceutical formulations including sustained-release agents.

EXAMPLE 1

13β,17α-diethyl-17-hydroxygonan-3-one

Add 13β,17α-diethyl-17-hydroxygon-4-en-3-one (10.0 g.) in ether-dioxane (1:1; 200 cc.) rapidly to freshly distilled liquid ammonia (1,000 cc.) containing lithium (1.0 g.). Stir for 15 minutes and then decompose the blue color with solid ammonium chloride. Add warm water until the solution reaches 25°, and filter the precipitate. Wash with water, dry and recrystallize from ether to obtain the title compound (4.6 g.), M.P. 135–138°; infrared absorption peaks at 2.88, 5.86, 11.29μ.

Analysis for $C_{21}H_{34}O_2$.—Calculated: C, 79.19; H, 10.76%. Found: C, 78.90; H, 10.97%.

EXAMPLE 2

13β-ethyl-17α-vinylgonan-17β-ol

Shake 13β-ethyl-17α-ethynylgon-4-en-17β-ol (0.175 g.) in pyridine (2.0 cc.) and benzene (2.0 cc.) with 2% palladized calcium carbonate (0.01 g.) in an atmosphere of hydrogen until uptake has ceased (31.4 cc. absorbed). Filter the catalyst, evaporate the solvent and recrystallize the residue from methanol containing a trace of ether to obtain the title compound, M.P. 102.5–104°.

EXAMPLE 3

13β,17α-diethylgonane-3β,17β-diol

Add sodium metal (3.0 g.) portionwise to a refluxing solution of 13β,17α-diethyl-17-hydroxygonan-3-one (1.0 g.) in isopropanol (100 cc.). When the sodium has completely reacted, add water cautiously and extract with ether. Dry the organic layer, remove the solvent and recrystallize the residue from ether to obtain the title compound (0.34 g.), M.P. 172–175°; infrared absorption peaks at 3.05, 6.18, 11.35μ.

Analysis for $C_{21}H_{36}O_2$.—Calculated: C, 78.69; H, 11.32%. Found: C, 78.47; H, 11.44%.

EXAMPLE 4

13β,17α-diethylgonane-3α,17β-diol

Reflux 13β,17α-diethyl-17β-hydroxygonan-3-one (0.5 g.) and aluminum isopropoxide (0.5 g.) in isopropanol (100 cc.) for 5 hours. Add water cautiously and extract the mixture with ether. Wash the organic solution with water, aqueous sodium bicarbonate, brine and dry. Remove the solvent and chromatograph the residue on neutral alumina (50 g.), eluting with benzene-ether (1:1) to separate the 3α-ol and the 3β-ol. Recrystallize from methanol to obtain the title compound (0.37 g.), M.P. 98–113 as a methanolate. Dry at 65° (0.1 mm. Hg) for 8 hours to obtain the pure material, M.P. 132–136°.

Analysis for $C_{21}H_{36}O_2$.—Calculated: C, 78.69; H, 11.32%. Found: C, 78.07; H, 11.34%.

EXAMPLE 5

13β,17α-diethyl-17β-hydroxy-5β-gonan-3-one

Dissolve 13β-ethyl-17α-ethynyl-17β-hydroxygon-4-en-3-one (1.5 g.) in ethanol (50 cc.) and shake with 10% palladium on charcoal (0.9 g.) in an atmosphere of hydrogen until uptake ceases. Filter off the catalyst, evaporate the solvent and recrystallize the residue from ether-hexane to afford the title compound, M.P. 192–196°.

Analysis for $C_{21}H_{34}O_2$.—Calculated: C, 79.19; H, 10.76%. Found: C, 79.4; H, 10.43%.

EXAMPLE 6

13β,17α-diethyl-5β-gonane-3α,17β-diol

To a refluxing solution of 13β,17α-diethyl-17β-hydroxy-5β-gonan-3-one (1.0 g.) in isopropanol (100 cc.) add sodium metal (2.5 g.) portionwise. When the sodium has completely reacted add water cautiously, extract with ether and wash and dry the ethereal solution. Remove the solvent and recrystallize from acetone to obtain the title compound (0.6 g.), M.P. 187–191°; infrared absorption peaks at 3.00μ.

Analysis for $C_{21}H_{36}O_2$.—Calculated: C, 78.69; H, 11.32%. Found: C, 78.98; H, 11.36%.

EXAMPLE 7

13β,17α-diethyl-5β-gonane-3β,17α-diol

Reflux 13β,17α-diethyl-17β-hydroxy-5β-gonan-3-one (1.0 g.) and aluminum isopropoxide (1.0 g.) in isopropanol (100 cc.) for 24 hours. Add water to the cooled reaction mixture and extract with ether. Wash the organic solution with water, aqueous sodium bicarbonate, dry and remove the solvent. Chromatograph the residue on neutral alumina (100 g.) and elute with benzene-hexane (1:1). Combine the first crystalline fractions and recrystallize from acetonitrile to obtain the title compound (0.21 g.), M.P. 176–180°; infrared absorption peak at 3.06μ.

Analysis for $C_{21}H_{36}O_2$.—Calculated: C, 78.69; H, 11.32%. Found: C, 78.33; H, 11.03%.

EXAMPLE 8

13β-ethyl-17β-hydroxygonan-3-one

Dissolve 13β-ethyl-17β-hydroxygon-4-en-3-one (5.0 g.) in ether-dioxane (1:1; 100 cc.) and add the solution to lithium (0.5 g.) in distilled liquid ammonia (500 cc.). Immediately discharge the blue color with solid ammonium chloride (25 g.), remove the ammonia and bring the solution to 28° by adding warm water. Extract the organic material into ether and wash the organic solution with water, brine and dry. Remove the solvent and chromatograph the crystalline residue on neutral alumina (210 g.). Elute with benzene and recrystallize the product from ether to obtain the title compound (3.8 g.), M.P. 134–137°; infrared absorption peaks at 2.89, 5.87, 11.3μ.

Analysis for $C_{19}H_{30}O_2$.—Calculated: C, 78.57; H, 10.41%. Found: C, 78.74; H, 10.34%.

EXAMPLE 9

13β-ethyl-17β-acetoxygonan-3-one

Dissolve 13β-ethyl-17β-hydroxygonan-3-one (1.9 g.) in pyridine (30 cc.) and acetic anhydride (2.0 cc.) and allow the mixture to stand at 28° for 75 hours. Pour the reaction mixture into water, extract with ether and wash the ethereal solution with water, 10% hydrochloric acid, water and brine. Remove the solvent and triturate with ether to obtain the title compound (1.85 g.), M.P. 148–152°; infrared absorption peaks at 5.76, 5.83, 8.02, and 11.31μ.

Analysis for $C_{21}H_{32}O_3$.—Calculated: C, 75.86; H, 9.70%. Found: C, 76.15; H, 9.86%.

EXAMPLE 10

13β-ethylgonane-3,17-dione

Dissolve 13β-ethyl-17β-hydroxygonan-3-one (1.0 g.) in acetone (50 cc.) and add 8 N chromic acid until a yellowish-orange color persists. Add excess isopropanol followed by solid sodium bicarbonate, filter and evaporate the filtrate. Recrystallize the residue from hexane to obtain the title compound, M.P. 133–135°; infrared absorption peaks at 5.78, 5.85μ.

Analysis for $C_{19}H_{28}O_2$.—Calculated: C, 79.12; H, 9.79%. Found: C, 78.61; H, 9.23%.

EXAMPLE 11

13β-ethyl-17β-hydroxy-5β-gonan-3-one

Dissolve 13β-ethyl-17β-hydroxygon-4-en-3-one (2.9 g.) in ethanol (40 cc.), add potassium hydroxide (0.725 g.) in water (15 cc.) and shake with 10% palladium on charcoal (0.29 g.) in an atmosphere of hydrogen at 45 p.s.i. for 2 hours. Filter the catalyst, evaporate the solvent and chromatograph the residue on neutral alumina (60 g.). Recrystallize the product from acetone-hexane and then from ethyl acetate to obtain the title compound (1.425 g.), M.P. 166–168°.

Analysis for $C_{19}H_{30}O_2$.—Calculated: C, 78.57; H, 10.41%. Found: C, 78.61; H, 10.6%.

EXAMPLE 12

13β-ethyl-17β-acetoxy-5β-gon-3-one

Dissolve 13β-ethyl-17β-hydroxy-5β-gon-3-one (4.7 g.) in pyridine (75 cc.) containing acetic anhydride (5.0 cc.). Allow the reaction mixture to stand for 16 hours, pour into water and extract with ether. Wash the ether solution with 10% hydrochloric acid, water saturated sodium bicarbonate, dry and evaporate the solvent. Triturate the residue with cold ether to obtain the title compound (3.05 g.), M.P. 138–141°; infrared absorption peaks at 5.77, 5.87μ.

EXAMPLE 13

13β-ethyl-3,3-ethylenedioxygonan-17β-ol

Reflux a solution of 13β-ethyl-17β-hydroxygonan-3-one (9.3 g.) and p-toluenesulfonic acid monohydrate (0.61 g.) in ethylene glycol (8.91 cc.) and benzene (300 cc.) for 17 hours under a water separator. Wash the cooled reaction mixture with 5% aqueous potassium bicarbonate, water, dry and evaporate the solvent. Chromatograph the residue on neutral alumina (300 g.) and elute with benzene-n-hexane and with benzene to obtain a solid (9.10 g.), M.P. 116–119°. Recrystallize twice from hexane to obtain the title compound, M.P. 118–121°; infrared absorption peaks at 2.93, 9.21μ.

Analysis for $C_{21}H_{34}O_3$.—Calculated: C, 75.4; H, 10.25%. Found: C, 75.59; H, 9.94%.

EXAMPLE 14

13β-ethyl-3,3-ethylenedioxygonan-17-one

Add 13β-ethyl-3,3-ethylenedioxygonan-17β-ol (1.0 g.) in pyridine (12 cc.) to chromium trioxide (1.02 g.) in pyridine (10 cc.) and stir the mixture for 2 hours at 25°. Pour the mixture into water (150 cc.) and extract with ether. Wash the ethereal solution with water, dry and evaporate the solvent. Remove traces of pyridine by azeotropic distillation with three 25 cc. portions of toluene. Chromatograph the crystalline product, M.P. 172–175° on neutral alumina (50 g.), eluting with benzene-n-hexane (1:1) to obtain a solid (0.79 g.), M.P. 173–175°. Recrystallize from hexane to obtain the title compound, M.P. 174–176°; infrared absorption peaks 5.76, 9.16μ.

Analysis for $C_{21}H_{32}O_3$.—Calculated: C, 75.86; H, 9.70%. Found: C, 76.10; H, 9.74%.

EXAMPLE 15

13β-ethyl-17β-acetoxy-3,3-ethylenedioxygonane

Allow a solution of 13β-ethyl-3,3-ethylenedioxygonan-17β-ol (2.01 g.) in pyridine (20 cc.) and acetic anhydride (1.75 cc.) to stand at 25° for 21 hours and then pour into water (100 cc.). Extract with ether and wash, dry, and evaporate the ethereal solution. Remove the residual pyridine by azeotropic distillation with toluene to afford the crude acetate, M.P. 136–141°. Chromatograph on neutral alumina (80 g.) eluting with n-hexane and benzene-n-hexane (1:9). Recrystallize twice from n-hexane to obtain the title compound (0.95 g.), M.P. 143–146°; infrared absorption peaks at 5.77, 8.02, 9.17μ.

Analysis for $C_{23}H_{36}O_4$.—Calculated: C, 73.36; H, 9.64%. Found: C, 73.53; H, 9.50%.

EXAMPLE 16

13β-ethyl-3,3-ethylenedioxy-5β-gonan-17β-ol

Dissolve 13β-ethyl-17β-hydroxy-5β-gonan-3-one (39.1 g.) in benzene (1,960 cc.) and ethylene glycol (88 cc.) containing p-toluene-sulfonic acid (0.392 g.) and reflux the mixture for 5 hours with stirring under a Dean-Stark trap. Add 0.1 N sodium hydroxide (100 cc.) to the cooled solution, separate the organic layer and wash with water until neutral. Dry, concentrate to about 100 cc. and allow to stand at 25° for 18 hours. Filter the precipitate to obtain the title compound. Recrystallize a sample (2.0 g.) from methanol (25 cc.) to obtain the pure compound (1.4 g.), M.P. 165.5–167°; infrared absorption peaks at 3.0, 3.46, 3.53, 6.92μ.

Analysis for $C_{21}H_{34}O_3$.—Calculated: C, 75.4; H, 10.25%. Found: C, 75.57; H, 9.95%.

EXAMPLE 17

13β-ethyl-3,3-ethylenedioxy-5β-gonan-17-one

To pyridine (85 cc.) at 10–15° add chromium trioxide (8.82 g.) over 10 minutes with stirring and after 15 minutes add 13β-ethyl-3,3-ethylenedioxy-5β-gonan-17β-ol (8.665 g.) in pyridine (100 cc.) with stirring. Allow the reaction mixture to warm to 25° and after stirring for a further 3 hours pour into water (1,000 cc.) and extract with ether. Wash the combined ethereal extracts with water, dry and evaporate, removing the last traces of pyridine by azeotropic distillation with toluene. Recrystallize from methanol to obtain the title compound (7.5 g.). Recrystallize a portion (1.0 g.) from methanol (25 cc.) to obtain the pure compound (0.86 g.), M.P. 157–158.5°; infrared absorption peaks at 3.53, 5.97μ.

Analysis for $C_{21}H_{32}O_3$.—Calculated: C, 75.86; H, 9.7%. Found: C, 75.66; H, 9.84%.

EXAMPLE 18

13β-ethyl-5β-gonane-3α,17β-diol

Dissolve 13β-ethyl-17β-hydroxy-5β-gonan-3-one (4.0 g.) in dry isopropanol (800 cc.) and add aluminum isopropoxide (4.0 g.) to the refluxing solution. After refluxing for 5 hours add water (275 cc.) and stir the resulting mixture at 25° for 18 hours. Pour into water, extract with ether and wash, dry and evaporate the ethereal solution. Treat the residue with boiling hexane, filter the insoluble material and recrystallize from ethyl acetate and then from methanol to obtain the title compound (0.825 g.), M.P. 212–215°; infrared absorption peaks at 3.05, 3.5, 6.9μ.

Analysis for $C_{19}H_{32}O_2$.—Calculated: C, 78.03; H, 11.03%. Found: C, 78.01; H, 10.75%.

EXAMPLE 19

13β-ethyl-5β-gonane-3β,17β-diol

Reduce 13β-ethyl-17β-hydroxy-5β-gonan-3-one with aluminum isopropoxide and isopropanol as described in the previous example. Treat the crude product with a mixture of hexane (25 cc.) and benzene (75 cc.), filter and chromatograph the residue on neutral alumina. Recrystallize from acetone-ether to obtain the title compound, M.P. 126–130°; infrared absorption peaks at 3.1, 3.5, 6.95μ.

Analysis for $C_{19}H_{32}O_2$.—Calculated: C, 78.03; H, 11.03%. Found: C, 77.85; H, 10.93%.

EXAMPLE 20

13β-ethylgonane-3α,17β-diol

Dissolve 13β-ethyl-17β-hydroxygonan-3-one (6.0 g.) in warm, dry isopropanol (600 cc.), heat to reflux and add aluminum isopropoxide (6.0 g.). After 5 hours refluxing, add water (300 cc.) and stir at 25° for 18 hours. Pour into water, extract with ether and wash, dry and evaporate the ethereal solution. Boil the residue with benzene containing 25% hexane. Filter the insoluble material, evaporate the filtrate and recrystallize from ether to obtain the title compound (0.82 g.), M.P. 181–183°; infrared absorption peaks at 3.0, 3.5μ.

Analysis for $C_{19}H_{32}O_2$.—Calculated: C, 78.03; H, 11.03%. Found: C, 77.94; H, 10.9%.

EXAMPLE 21

13β-ethylgonane-3β,17β-diol

Recrystallize the material insoluble in benzene-hexane from the previous experiment (3.76 g.) from methanol to obtain the title compound (1.49 g), M.P. 236–240°; infrared absorption peaks at 3.05, 3.5μ.

Analysis for $C_{19}H_{32}O_2$.—Calculated: C, 78.03; H, 11.03%. Found: C, 78.02; H, 10.85%.

EXAMPLE 22

13β-ethylgonan-17β-ol

Reflux 13β-ethyl-17β-hydroxygonan-3-one (4.07 g.) with ethylene glycol (50 cc.), hydrazine hydrate (2.06 cc.), and potassium hydroxide (2.78 g.) for one hour. Remove the condenser, heat until the reaction temperature reaches 210° and then reflux for a further 3 hours. Cool, pour into water and extract with ether. Wash, dry and evaporate the ether solution and chromatograph the residue on neutral alumina (120 g.), eluting with benzene-hexane (1:4) and (1:1). Recrystallize a portion (0.75 g.) of the material isolated from the eluates twice from N-hexane to obtain the pure title compound, M.P. 119–121°; infrared absorption peak at 3.03μ.

Analysis for $C_{19}H_{33}O$.—Calculated: C, 82.54; H, 11.66%. Found: C, 82.78; H, 11.63%.

EXAMPLE 23

13β-ethylgonan-17-one

To a stirred solution of 13β-ethylgonan-17β-ol (2.54 g.) in acetone (150 cc.) at 0° add 8 N chromic acid (5.0 cc.) and stir for 15 minutes. Add isopropanol (5.0 cc.) to the stirred solution, decant the supernatent into water (500 cc.) and extract with ether. Wash, dry and evaporate the ethereal solution and chromatograph the residue on neutral alumina (100 g.), eluting with hexane and hexane-benzene (1:9) to afford the title compound 2.18 g., M.P. 90–93°. Recrystallize a portion twice from methanol to obtain the pure product, M.P. 94–96°; infrared absorption peak at 5.76μ.

Analysis for $C_{19}H_{30}O$.—Calculated: C, 83.15; H, 11.02%. Found: C, 83.01; H, 10.84%.

EXAMPLE 24

13β-ethyl-17β-hydroxy-2α-methylgonan-3-one

Stir 13β-ethyl-17β-hydroxygonan-3-one (3.0 g.) in dry benzene (100 cc.) with ethyl oxalate (3.6 cc.) and sodium methoxide (1.8 g.) in an atmosphere of nitrogen for 4 hours. Dilute with hexane (250 cc.), filter the precipitate and dry. Add this yellow powder in small portions to a stirred solution of 1 N hydrochloric acid (150 cc.) and stir for one hour. Filter, wash the precipitate and dry to obtain 13β-ethyl - 2 - ethoxalyl-17β-hydroxygonan-3-one (3.75 g.). Reflux this material with potassium carbonate (6.5 g.) and methyl iodide (10 cc.) in acetone (100 cc.) for 48 hours, adding a further 5 cc. of methyl iodide after 24 hours. Filter, evaporate the filtrate and dissolve the residue in methylene chloride and wash with 2% sodium hydroxide, water and brine. Dry and evaporate the organic solution and dissolve the gummy residue in a solution of sodium (1.2 g) in ethanol (100 cc.) and allow to stand at 25° for 48 hours. Dilute with water, extract with methylene chloride. Wash, dry and evaporate the organic solution and chromatograph the residue on neutral alumina (50 g.), eluting with benzene-hexane (1:1, 200 cc.) and benzene (200 cc.). From the benzene eluate crystallize the product from hexane to obtain the title compound (0.38 g.), M.P. 160–162°; infrared absorption peaks at 2.9, 5.86μ.

Analysis for $C_{20}H_{32}O_2$.—Calculated: C, 78.89; H, 10.59%. Found: C, 79.00; H, 10.33%.

EXAMPLE 25

13β-ethyl-17β-tetrahydropyranyloxy-2α-methylgonan-3-one

Stir 13β - ethyl - 17β-hydroxy - 2α - methylgonan-3 - one (0.3 g.) in dry benzene (10 cc.) and freshly distilled dihydropyran (2 cc.) with p-toluene - sulfonic acid (0.03 g.) at 25° for 24 hours. Dilute with ether, wash with aqueous sodium bicarbonate, water and brine. Dry and evaporate the organic solution, removing last traces of dihydropyran under high vacuum. Dissolve the residue in hexane and chromatograph on basic alumina (30 g.), eluting with hexane (150 cc.), hexane-benzene (4:1; 200 cc.) and hexane-benzene (1:1, 200 cc.). Evaporate the latter eluate and dry in vacuo to obtain the title compound (0.26 g.) as a gum; infrared absorption peak at 5.85μ.

EXAMPLE 26

13β-ethyl-17α-chloroethynyl-3,3-ethylenedioxygonan-17β-ol

Into a suspension of 1.7 molar ethereal methyl lithium (17.7 cc.) in ether (75 cc.) at 0° under nitrogen add dropwise cis-1,3-dichloroethylene (18 cc.) in anhydrous ether (25 cc.). When the addition is complete, remove the cooling bath and stir the suspension at 25° for 30 minutes. Add 13β-ethyl-3,3-ethylenedioxygonan-17-one (2.0 g.) in anhydrous ether and stir for 3 hours at 25°. Add water (5 cc.) to the reaction mixture, wash the ethereal solution with water and brine, remove the solvent and recrystallize the crude product from n-hexane to obtain the title compound, M.P. 177–180. Recrystallize the compound (0.88 g.) from n-hexane to obtain material, M.P. 181–183.5°; infrared absorption peaks at 2.97, 4.56, 9.15μ.

Analysis for $C_{23}H_{33}ClO_3$.—Calculated: C, 70.29; H, 8.46; Cl, 9.02%. Found: C, 70.50; H, 8.57; Cl, 9.04%.

EXAMPLE 27

13β-ethyl-17α-chloroethynyl-17β-hydroxygonan-3-one

Allow 13β - ethyl - 17α-chloroethynyl - 3,3 - ethylenedioxygonan-17β-ol (3.71 g.) in tetrahydrofuran (50 cc.) and 3 N perchloric acid (25 cc.) to stand at 25° for one hour and then dilute with water. Filter the precipitate, wash and dry by azeotropic distillation with benzene and recrystallize from acetone-n-hexane to obtain the title compound (2.3 g.), M.P. 212–215°; infrared absorption peaks at 3.05, 4.56, 5.90μ.

Analysis for $C_{21}H_{29}ClO_2$.—Calculated: C, 72.29; H, 8.38; Cl, 10.16%. Found: C, 72.21; H, 8.35; Cl, 10.2%.

EXAMPLE 28

13β-ethyl-17α-chloroethynylgonane-3β,17β-diol

To a solution of 13β-ethyl-17α-chloroethynyl-17β-hydroxygonan-3-one (1.05 g.) in dry tetrahydrofuran (40 cc.) add lithium aluminum tri-t-butoxyhydride (1.54 g.) in an atmosphere of nitrogen and stir the mixture at 0° for 5 hours. Add saturated aqueous sodium sulfate (2.0 cc.), filter and evaporate the solvent. Dissolve the residue in ether (200 cc.), wash, dry and evaporate. Recrystallize the residue (0.92 g.) three times from toluene to obtain the pure title compound, M.P. 180–184°; infrared obsorption peaks at 3.0, 4.55μ.

Analysis for $C_{21}H_{31}ClO_2$.—Calculated: C, 71.87; H 8.91; Cl, 10.10%. Found: C, 72.11; H, 9.03; Cl, 9.80%

EXAMPLE 29

13β-ethyl-17α-chloroethynylgonane-3β,17β-diol and
13β-ethyl-17α-chloroethynylgonane-3α,17β-diol Evaporate the mother liquors of the previous example and recrystallize the residue from ether-hexane to obtain a mixture of the title compounds (0.09 g.), M.P. 88–105°.

EXAMPLE 30

13β-ethyl-17α-chloroethynyl-3,3-ethylenedioxy-5β-gonan-17β-ol

Into a suspension of 1.7 molar ethereal methyl lithium (71 cc.) in ether (125 cc.) at 0° under nitrogen add dropwise a solution of cis-1,2-dichloroethylene in anhydrous ether (30 cc.). Remove the cooling bath and stir the suspension for 30 minutes at 25° and then add 13β-ethyl-3,3-ethylenedioxy-5β-gonan-17-one (4.99 g.) in ether (350 cc.). Continue stirring for four hours at 25°, then add water (15 cc.) carefully and after stirring a further 5 minutes wash the ethereal phase with water, brine and dry. Evaporate the solvent and recrystallize the residue from n-hexane to obtain the title compound (4.53 g.), M.P. 160–164.5°. Recrystallize a sample from n-hexane to obtain the pure compound, M.P. 165–167.5°; infrared absorption peaks at 2.97, 4.55, 9.08μ.

Analysis for $C_{23}H_{33}ClO_3$.—Calculated: C, 70.29; H, 8.46; Cl, 9.02%. Found: C, 70.36; H, 8.38; Cl, 9.3%.

EXAMPLE 31

13β-ethyl-17α-chloroethynyl-17β-hydroxy-5β-gonan-3-one

Allow a solution of 13β-ethyl-3,3-ethylenedioxy-17α-chloroethynyl-5β-gonan-17β-ol (3.6 g.) in tetrahydrofuran (50 cc.) and 3 N perchloric acid (25 cc.) to stand in a nitrogen atmosphere at 25° for 3 hours. Dilute with ice water (175 cc.), extract with ether and wash, dry and evaporate the ethereal solution. Chromatograph the residue (3.09 g.) in benzene (20 cc.) on silica gel (150 g.) and isolate solid material from the ether-benzene (1:4) eluates. Recrystallize the solid (2.54 g.) three times from toluene to obtain the title compound 1.93 g., M.P. 77–89°. Recrystallize a portion three times from toluene to obtain the material as a toluene solvate, M.P. 91–96°; infrared absorption peaks at 3.04, 4.52, 5.92, 6.24, 6.69, 13.63, 14.39μ.

Analysis for $C_{21}H_{29}ClO_2 \cdot C_7H_8$.—Calculated: C, 76.25; H, 8.46; Cl, 8.04%. Found: C, 76.16; H, 8.42; Cl, 8.17%.

EXAMPLE 32

13β-ethyl-17α-chloroethynyl-5β-gonane-3α,17β-diol

To a solution of 13β-ethyl-17α-chloroethynyl-17β-hydroxy-5β-gonan-3-one, monotoluene solvate (1.12 g.) in tetrahydrofuran (45 cc.) add lithium aluminum tri-t-butoxyhydride (1.66 g.) in an atmosphere of nitrogen and stir the mixture at 0° for 2½ hours. Add saturated aqueous sodium sulfate (2.0 cc.), filter and evaporate the solvent. Dissolve the residue in ether (200 cc.), wash, dry and evaporate. Recrystallize the residue twice from acetone-n-hexane to obtain the title compound (0.72 g.), M.P. 173.5–175°; infrared absorption peaks at 3.05, 4.52μ.

Analysis for $C_{21}H_{31}ClO_2$.—Calculated: C, 71.87; H, 8.91; Cl, 10.10%. Found: C, 72.02; H, 9.10; Cl, 9.8%.

EXAMPLE 33

13β-ethyl-3,3-ethylenedioxy-17α-ethynyl-5β-gonan-17β-ol

Pass acetylene through a solution of 13β-ethyl-3,3-ethylenedioxy-5β-gonan-17-one (11.82 g.) in dimethylacetamide (150 cc.) for one hour, then add lithium acetylide-ethylenediamine (8.08 g.) and stir in an atmosphere of acetylene for 3 hours. Pour onto ice and extract with benzene. Wash the organic solution with brine, water until neutral and evaporate. Crystallize the residue from methanol to obtain the title compound (11.4 g.). Recrystallize a sample from benzene-hexane to obtain the pure compound, M.P. 170–171°; infrared absorption peaks at 2.95, 3.50, 6.93μ.

Analysis for $C_{23}H_{34}O_3$.—Calculated: C, 77.05; H, 9.56%. Found: C, 77.31; H, 9.43%.

EXAMPLE 34

13β-ethyl-3,3-ethylenedioxy-17α-ethynylgonan-17β-ol

Ethynylate 13β-ethyl-3,3-ethylenedioxygonan-3-one as described for the 5β-isomer in the previous example to obtain the title compound M.P. 191.5–193° (from chloroform-methanol); infrared absorption peaks at 2.93, 3.13, 3.47, 3.52, 4.78μ.

Analysis for $C_{23}H_{34}O_3$.—Calculated: C, 77.05; H, 9.56%. Found: C, 76.79; H, 9.28%.

EXAMPLE 35

13β-ethyl-17α-ethynyl-17β-hydroxy-5β-gonan-3-one

Dissolve 13β-ethyl-3,3-ethylenedioxy-17α-ethynyl-5β-gonan-17β-ol (8.3 g.) in acetone (150 cc.) and add p-toluenesulfonic acid (0.2 g.) in water (3 cc.) and stir under nitrogen for 5 hours. Add aqueous sodium bicarbonate, remove most of the acetone by evaporation under reduced pressure and extract the resulting slurry with chloroform. Wash the organic solution with water until neutral, dry and evaporate. Crystallize the residue from benzene to obtain the title compound (5–8 g.). Recrystallize a portion (1.0 g.) by dissolving in chloroform-methanol (1:1) and boiling off most of the chloroform to obtain the purified compound (0.56 g.), M.P. 194–195°; infrared absorption peaks at 2.91, 3.13, 3.47, 5.88μ.

Analysis for $C_{21}H_{30}O_2$.—Calculated: C, 80.21; H, 9.62%. Found: C, 80.20; H, 9.58%.

EXAMPLE 36

13β-ethyl-17α-ethynyl-17β-hydroxygonan-3-one

Hydrolyze 13β-ethyl-3,3-ethylenedioxy-17α-ethynyl-gonan-17β-ol as described for the 5β-isomer in the previous example to obtain the title compound, M.P. 210–211° (from chloroform-methanol); infrared absorption peaks at 3.02, 3.46, 3.53, 5.90μ.

Analysis for $C_{21}H_{30}O_2$.—Calculated: C, 80.21; H, 9.62%. Found: C, 80.37; H, 9.8%.

EXAMPLE 37

13β-ethyl-17α-ethynyl-5β-gonane-3α,17β-diol

Dissolve 13β-ethyl-17α-ethynyl-17β-hydroxy-5β-gonan-3-one (1.0 g.) in methanol (50 cc.), add sodium borohydride (0.08 g.) and stir for one hour at 25°. Add water, remove most of the methanol by evaporation under reduced pressure and extract with chloroform. Wash, dry and evaporate the chloroform extracts and recrystallize the residue twice from ethyl acetate to obtain the title compound (0.581 g.), M.P. 195–197°; infrared absorption peaks at 3.06, 3.52, and 6.89μ.

Analysis for $C_{21}H_{32}O_2$.—Calculated: C, 79.7; H, 10.19%. Found: C, 79.51; H, 10.02%.

EXAMPLE 38

13β-ethyl-17α-ethynyl-5β-gonane-3α,17β-diol and

13β-ethyl-17α-ethynyl-5βgonane-3β,17β-diol

Evaporate the mother liquor obtained from the first recrystallization of the product of the previous example to obtain a mixture of the title compounds.

EXAMPLE 39

13β-ethyl-17α-ethynylgonane-3α,17β-diol and

13β-ethyl-17α-ethynyl-5β-gonane-3β-17β-diol

Dissolve 13β-ethyl-17α-ethynyl-17β-hydroxygonan-3-one (1.0 g.) in methanol (50 cc.), add sodium borohydride (0.8 g.) and stir for one hour at 25°. Add water, remove most of the solvent under reduced pressure and extract with chloroform. Wash, dry and evaporate the chloroform extracts to leave as residue a mixture of the title compounds.

EXAMPLE 40

13β-ethyl-3-oxo-5β-gonane-17β-carboxylic acid

Stir methyl triphenylphosphonium bromide (116 g.) in anhydrous ether (1,600 cc.) with 20% ethereal phenyl lithium (133 cc.) in an atmosphere of nitrogen at 25° for 2 hours, and then add a solution of 13β-ethyl-3-methoxy-gona-1,3,5(10)-trien-17-one (20 g.) in tetrahydrofuran (200 cc.) and ether (400 cc.) and stir the mixture for 5 hours and allow to stand overnight. Distill off the ether, replacing it by the simultaneous addition of tetrahydrofuran, reflux the suspension for 18 hours, cool and filter. Concentrate the filtrate to a syrup and repeatedly extract it with boiling ether-petroleum ether mixture (800 cc.). Add water to the residue and extract with ether-petroleum ether. Combine the organic extracts and wash with 5% aqueous hydrochloric acid, water, aqueous sodium bicarbonate, water and brine, and dry. Evaporate the solvent and stir the residue with petroleum ether-benzene (4:1; 500 cc.) and filter through a column of neutral alumina (100 g.), eluting with the same solvent mixture. Evaporate the eluates and recrystallize the residue from methanol to obtain 13β-ethyl-17-methylene-3-methoxygona-1,3,5(10)-triene (11.6 g.), M.P. 97–100°.

Analysis for $C_{21}H_{30}O$.—Calculated: C, 85.08; H, 9.52%. Found: C, 85.02; H, 9.68%.

Dissolve this 17-methylene compound (11.0 g.) in tetrahydrofuran (200 cc.) and treat the solution with diborane [generated by the slow addition of sodium borohydride (5.0 g.) in diethyleneglycol dimethyl ether (110 cc.) to boron trifluoride etherate (38 cc.) in diethyleneblycol dimethyl ether (110 cc.) over 1½ hours] in an atmosphere of nitrogen. Allow the solution to stand overnight, cool to 0° and decompose by carefully adding water. Add aqueous 3 N sodium hydroxide (60 cc.) and 30% hydrogen peroxide (60 cc.) and reflux for 30 minutes. Add ether and separate, wash and dry the organic layer and concentrate to small volume. Add a little acetonitrile and evaporate until crystallization begins. Filter and dry the produut to obtain 13β-ethyl-17β-hydroxymethyl-3-methoxygona-1,3,5(10)-triene (10.8 g.), M.P. 111–114°. Recrystallize from ether-petroleum ether to obtain a sample, M.P. 123–125°.

Analysis for $C_{21}H_{30}O_2$.—Calculated: C, 80.21; H, 9.62%. Found: C, 80.14; H, 9.40%.

To a solution of the above 17-hydroxymethyl compound (33.5 g.) in acetone (300 cc.) at 0° add 8 N chromic acid (85 cc.) and stir for 20 minutes at 25°. Add excess isopropanol, boil the suspension and filter through a pad of sodium sulfate. Shake the residue with water, filter the insoluble material and heat with 95% ethanol, cool and filter to obtain 13β-ethyl-3-methoxygona-1,3,5-(10)-triene, 17β-carboxylic acid (13.1 g.), M.P. 235–240°. Obtain a further 13.65 g. of material from the acetone filtrate by diluting with water, concentrating and filtering the precipitate.

Analysis for $C_{21}H_{28}O_3$.—Calculated: C, 76.79; H, 8.59%. Found: C, 76.70; H, 8.46%.

Slowly add a solution of 13β-ethyl-3-methoxygona-1,3,5(10)-triene, 17β-carboxylic acid (34 g.) in tetrahydrofuran (1,600 cc.) to a stirred solution of lithium (34 g.) in liquid ammonia (5,000 cc.). Stir for one hour and then slowly add ethanol (ca. 600 cc.) over 20 minutes. When the blue color is discharged evaporate the ammonia, gradually replacing it with ethanol (2,000 cc.). Acidify the hot solution with 20% hydrochloric acid and stir until a clear solution results. Allow to cool for one hour, and then dilute with twice its volume of water with stirring. Filter, wash and dry the precipitate and recrystallize from aqueous ethanol to obtain 13β-ethyl-3-oxogon-4-ene-17β-carboxylic acid (24.3 g.), M.P. 224–228°. Purify further from acetone-hexane to obtain an analytical sample, M.P. 226–228°.

Analysis for $C_{20}H_{28}O_3$.—Calculated: C, 75.91; H, 8.92%. Found: C, 75.53; H, 8.92%.

Shake 13β-ethyl-3-oxogon-4-ene-17β-carboxylic acid (2.0 g.) in ethanol (50 cc.) and water (3.0 cc.) containing potassium hydroxide (1.5 g.) with 10% palladized charcoal catalyst (0.2 g.) in an atmosphere of hydrogen at 40 p.s.i. for one hour. Filter the solution and acidify the filtrate with glacial acetic acid. Dilute the filtrate with water and filter the precipitate to obtain the title compound (1.6 g.), M.P. 195–200°. Purify by recrystallizing twice from 95% ethanol to obtain the pure compound as a hemiethanolate, M.P. 244–247°; infrared absorption peaks at 5.76, 5.82, 5.94μ.

Analysis for $C_{20}H_{30}O_3 \cdot \frac{1}{2} C_2H_5OH$.—Calculated: C, 73.9; H, 9.45%. Found: C, 73.85; H, 9.73%.

EXAMPLE 41

13β-ethyl-17β-acetoxyacetyl-5β-gonan-3-one

Titrate 13β-ethyl-3-oxo-5β-gonane-17β-carboxylic acid (1.75 g.) in hot methanol (50 cc.) with aqueous O.1 N sodium hydroxide using phenolphthalein as indicator until a pink color persists. Evaporate the methanol and lyophilize the aqueous solution and dry at 110° for 16 hours. To this sodium salt (0.6 g.) in redistilled benzene (20 cc.) and pyridine 3 drops add redistilled oxalyl chloride (20 cc.). When evolution of gas has ceased stir the solution for a few minutes and evaporate the solvent under reduced pressure. Repeatedly dissolve the residue in dry benzene and evaporate and then dissolve the residue in dry benzene (10 cc.), filter and wash the residue with portions of benzene. Dilute the filtrate and washings with ether and add the solution to a stirring ethereal solution of diazomethane (prepared from 5.0 g. of n-nitrosomethylurea and 15 cc. of 50% aqueous potassium hydroxide and 50 cc. of ether, the ethereal distillate being dried first over potassium hydroxide and then over sodium wire) at −15°. Keep the mixture at −15° for 30 minutes and at 0° for a further 1½ hours. Remove the solvent under reduced pressure at 15–20° and chromatograph the gummy residue on "Florex" to obtain a series of non-crystalline fractions. Combine these fractions and heat with glacial acetic acid at 100° for 20 minutes. Remove the acetic acid under reduced pressure, dissolve the residue in ether and wash the ethereal solution with aqueous 2% sodium bicarbonate and brine, dry and evaporate to obtain a gum. Dissolve the gum in a little benzene and filter through a column of neutral alumina (5.0 g.), eluting with benzene (40 cc.) and benzene-ether (4:1; 100 cc.) to obtain a series of fractions which crystallize on scratching with acetone-hexane. Recrystallize the fraction eluted with benzene-ether from acetone-hexane to obtain the title compound, M.P. 126–128°, infrared absorption peaks at 5.7, 5.78, 5.85μ.

Analysis for $C_{23}H_{34}O_4$.—Calculated: C, 73.76; H, 9.15%. Found: C, 73.49; H, 8.97%.

EXAMPLE 42

13β-ethyl-17β-(1,2-dihydroxyethyl)-5β-gonan-3-one and

13β-ethyl-17β-(1,2-dihydroxyethyl)gonan-3-one

Add distilled ethoxyacetylene (9.0 g.) to a stirred solution of 3 M ethereal methyl magnesium bromide (32 cc.) and reflux the mixture for 1½ hours. Slowly add 13β-ethyl-3-methoxygona-1,3,5(10)-trien-17-one (7.0 g.) in tetrahydrofuran (80 cc.) and reflux the mixture overnight. Add aqueous ammonium chloride to the cooled reaction mixture, extract with benzene, and wash and dry the organic solution. Treat the hot solution with charcoal, filter and remove the solvent. Crystallize the residue from hexane-ether to obtain crude 17α-ethoxyethynyl-13β-ethyl-3-methoxygona - 1,3,5(10) - trien - 17β-ol (6.2 g.), M.P. 105–110°. Recrystallize from hexane-ether to obtain the pure compound, M.P. 121–123°; infrared absorption peaks at 2.86, 4.46μ.

Analysis for $C_{24}H_{32}O_3$.—Calculated: C, 78.22; H, 8.75%. Found: C, 78.45; H, 9.09%.

Shade the foregoing ethoxyethynyl compound (2.0 g.) in pyridine (30 cc.) with a suspension of pre-hydrogenated 2% palladized calcium carbonate (0.8 g.) in pyridine (10 c.) in an atmosphere of hydrogen at 25° until one molecular equivalent of hydrogen has been absorbed. Filter and evaporate the filtrate to obtain a gum. Dissolve the gum in tetrahydrofuran (25 cc.) and 10% aqueous hydrochloric acid (5 cc.) and allow the solution to stand at 25° for 1½ hours. Dilute with ether, wash with water, aqueous sodium bicarbonate, water and brine, dry and evaporate. Crystallize the residue from methanol to obtain 17-(2-oxo-ethylidine)-13β-ethyl-3-methoxygona - 1, 3,5(10)-triene (1.1 g.), M.P. 133–136°. Recrystallize from acetone-hexane to obtain a sample, M.P. 136–138°; infrared absorption peaks at 5.98, 6.12μ; ultraviolet absorption maximum 243 mμ (ϵ19,300).

Analysis for $C_{22}H_{28}O_2$.—Calculated: C, 81.44; H, 8.70%. Found: C, 81.17; H, 8.47%.

Dissolve this 17-(2-oxoethylidine)gona-1,3,5(10)-triene (0.8 g.) in tetrahydrofuran (10 cc.) add the solution to a mixture of sodium borohydride in methanol (15 cc.) and allow the mixture to stand at 25° for 1½ hours. Decompose excess reducing agent with 50% aqueous acetic acid, concentrate under reduced pressure and dilute with water. Filter the precipitate and recrystallize from ethanol to obtain 13β-ethyl-17-(2-hydroxyethylidene)-3-methoxygona-1,3,5(10)-triene (0.6 g.), M.P. 161–162°. Purify from benzene-hexane to obtain a sample, M.P. 164–165°.

Analysis for $C_{22}H_{30}O_2$.—Calculated: C, 80.93; H, 9.26%. Found: C, 80.87; H, 9.18%.

To a stirred suspension of 13β-ethyl-17-(2-hydroxyethylidene)-3-methoxygona-1,3,5(10)-triene (7.5g.) in warm redistilled dihydropyran (100 cc.) add concentrated hydrochloric acid (10 drops) and stir the mixture at 25° for 48 hours. Pour the mixture into aqueous sodium bicarbonate, extract with ether, and wash, dry and evaporate the ethereal extracts. Chromatograph the gummy residue on basic alumina (200 g.), eluting with benzene (ca. 2,000 cc.). Evaporate the eluate to obtain 13β-ethyl-17 - (2 - tetrahydropyranyloxyethylidene) - 3-methoxygona-1,3,5(10)-triene as a gum. Dissolve this material in redistilled tetrahydrofuran (300 cc.) and treat with diborane [prepared by the slow addition of sodium borohydride (25 g.) in diethyleneglycol dimethyl ether (450 cc.) to boron trifluoride etherate (190 cc.) in diethyleneglycol dimethyl ether (450 cc.)] for 1½ hours. Allow the mixture to stand for 16 hours and then decompose excess reagent by carefully adding a solution of sodium hydroxide (15 g.) in water (120 cc.), followed by aqueous 30% hydrogen peroxide (120 cc.) and reflux with vigorous stirring for one hour. Dilute the cooled solution with ether, wash with brine and evaporate to obtain a gum. Dissolve this gum in tetrahydrofuran and treat with 10% hydrochloric acid (20 cc.) at 25° for 18 hours. Dilute the mixture with ether, wash with water, aqueous sodium bicarbonate, brine, dry and evaporate the solvent. Crystallize the residue with ether and recrystallize from acetone-hexane to obtain 13β-ethyl - 17β-(1,2-dihydroxyethyl) - 3 - methoxygona - 1,3, 5(10)-triene (1.7 g.), M.P. 157–159°; infrared absorption peak at 3.05μ.

Analysis for $C_{22}H_{32}O_3$.—Calculated: C, 76.60; H, 9.36%. Found: C, 76.98; H, 9.45%.

Add 13β-ethyl - 17β - (1,2-dihydroxyethyl)-3-methoxygona-1,3,5(10)-triene (0.95 g.) in tetrahydrofuran (25 cc.) to a solution of lithium (0.5 g.) in tetrahydrofuran (10 cc.) and liquid ammonia (100 cc.). After stirring for one hour add absolute ethanol dropwise until the blue color is discharged, and then add aqueous ammonium chloride, extract with ether and wash, dry and evaporate the organic solution. Dissolve the resultant gum in tetrahydrofuran (40 cc.) add 10% hydrochloric acid (10 cc.) and stir for one hour. Dilute the mixture with ether, wash, dry and evaporate the solution and recrystallize the residue from acetone-hexane to obtain 13β-ethyl-17β-(1,2-dihydroxyethyl)gon-4-en-3-one (0.57 g.), M.P. 165–168°. Recrystallize further to obtain the pure compound, M.P. 167–169°; infrared absorption peaks at 2.98, 5.98, 6.04, 6.19μ; ultraviolet absorption maximum 242 mμ (ϵ 17,500).

Analysis for $C_{21}H_{32}O_3$.—Calculated: C, 75.86; H, 9.70%. Found: C, 76.30; H, 9.57%.

Dissolve the foregoing gon-4-en-3-one (1.0 g.) in 95% ethanol (60 cc.) containing potassium hydroxide (1.5 g.) and shake with a 5% palladium on charcoal catalyst (0.4 g.) in an atmosphere of hydrogen at 40 p.s.i. for 40 minutes. Filter the catalyst, concentrate the filtrate, acidify with 10% hydrochloric acid and dilute with water. Extract with a mixture of ether and tetrahydrofuran and wash the organic solution with brine and dry. Remove the solvent to leave as residue a mixture of the title compounds (0.614 g.).

EXAMPLE 43

13β-ethyl-17β-acetoxyacetyl-5β-gonan-3-one

Allow 13β-ethyl - 17β - (1,2-dihydroxyethyl)-5β-gonan-3-one and 13β-ethyl - 17β - (1,2-dihydroxyethyl)gonan-3-one (0.313 g., the mixture prepared as described in the foregoing experiment) to stand in acetic anhydride (0.101 g.) and pyridine (10 cc.) for 16 hours at 25° and then pour into water and extract with ether. Wash the ethereal solution with 10% hydrochloric acid, water, aqueous sodium bicarbonate, brine and dry. Remove the solvent and dissolve the residual gum in acetone (20 cc.) and add 8 N chromic acid dropwise until a yellowish-orange color persists. After 10 minutes add excess isopropanol followed by solid sodium bicarbonate, filter the mixture and evaporate the filtrate. Filter the residue through a short column of neutral alumina, eluting with ether containing 10% chloroform, evaporate the eluate and seed the residue to obtain the title compound (0.05 g.), M.P. 115–119°. Recrystallize twice from acetone-hexane to obtain material, M.P. 121–124°.

EXAMPLE 44

13β-ethyl-17β-(1,2-diacetoxyethyl)-5β-gonan-3-one

Allow 13β-ethyl - 17β - (1,2-dihydroxyethyl)-5β-gonan-3-one and 13β-ethyl - 17β - (1,2-dihydroxyethyl)gonan-3-one (0.301 g., the mixture obtained by hydrogenation of the corresponding gon-4-en-3-one as described in Example 42) to stand in acetic anhydride (5.0 cc.) and pyridine (25 cc.) at 25° for 16 hours and then dilute with water and extract with ether. Wash, dry and evaporate the ethereal solution and crystallize the residue from acetone-hexane to obtain the title compound (0.15 g.), M.P. 154–156; infrared absorption peaks at 5.75, 5.88μ.

Analysis for $C_{25}H_{38}O_5$.—Calculated: C, 71.74; H, 9.15%. Found: C, 71.84; H, 9.04%.

EXAMPLE 45

13β-ethyl-17β-(1,2-dihydroxyethyl)-5β-gonan-3-one

Add 13β-ethyl - 17β - (1,2-diacetoxyethyl)-5β-gonan-3-one (0.1 g.) in warm methanol (15 cc.) to a solution of 85% potassium hydroxide (0.5 g.) in water (3.0 cc.) and heat the solution at 100° for 15 minutes and then allow to stand at 25° for one hour. Concentrate the solution, dilute with ether, and wash with water and brine and dry. Evaporate the solvent and crystallize with isopropyl ether and recrystallize from isopropyl ether-acetone to obtain the title compound (0.06 g.), M.P. 158–160°; infrared absorption peaks at 2.95, 5.85μ.

Analysis for $C_{21}H_{34}O_3$.—Calculated: C, 75.4; H, 10.25%. Found: C, 75.22; H, 10.49%.

EXAMPLE 46

13β-ethyl-17β-hydroxyacetyl-5β-gonan-3-one

Stir 13β-ethyl - 17β - acetoxyacetyl-5β-gonan-3-one (0.4 g.) in methanol (200 cc.) with potassium bicarbonate (0.8 g.) in water (120 cc.) at 25° for 18 hours in an atmosphere of nitrogen. Extract twice with chloroform, wash the organic solution with water and brine, dry and evaporate. Crystallize the residue from ether-hexane to obtain the title compound (0.25 g.), M.P. 145–148°. Recrystallize from acetone-hexane to obtain material, M.P. 149–151°; infrared absorption peaks at 2.95, 5.90μ.

Analysis for $C_{21}H_{32}O_3$.—Calculated: C, 75.86; H, 9.70%. Found: C, 76.21; H, 10.03%.

EXAMPLE 47

13β-ethyl-17β-hemisuccinoyloxyacetyl-5β-gonan-3-one

Allow 13β-ethyl - 17β - hydroxyacetyl-5β-gonan-3-one (0.15 g.) and succinic anhydride (0.25 g.) in pyridine (5.0 cc.) to stand at 25° for 72 hours in an atmosphere of nitrogen and then pour into ice water and acidify the mixture with 10% hydrochloric acid. Filter the precipitate, wash with water, triturate with ethanol-ether, dry and recrystallize from acetone-hexane to obtain the title compound (0.075 g.), M.P. 183–185°; infrared absorption peaks at 3.25, 5.74, 5.85μ.

Analysis for $C_{25}H_{36}O_6$.—Calculated: C, 69.42; H, 8.39%. Found: C, 69.6; H, 8.48%.

EXAMPLE 48

13β-ethyl-17β-acetoxyacetylgonan-3-one

Allow 13β-ethyl - 17β - (1,2-dihydroxyethyl)gon-4-en-3-one (0.58 g.) in pyridine (19.5 cc.) and acetic anhydride (0.204 g.) to stand for 16 hours at 25° and then pour into water (100 cc.), stir, and filter and dry the precipitate to obtain 13β-ethyl-17β-(1-hydroxy-2-acetoxyethyl)gon-4-en-3-one (0.55 g.), M.P. 158–161°. Purify a sample from acetone-hexane to obtain material, M.P. 162–164°; infrared absorption maxima at 2.97, 5.74, 6.04, 6.21μ; ultraviolet absorption maximum at 242 mμ (ε 17,000).

Analysis for $C_{23}H_{34}O_4$.—Calculated: C, 73.76; H, 9.15%. Found: C, 73.49; H, 9.27%.

Add 8 N chromic acid to 13β-ethyl-17β-(1-hydroxy-2-acetoxyethyl)gon-4-en-3-one (0.45 g.) in acetone (50 cc.) until a yellowish-orange color persists. After 10 minutes add excess isopropanol followed by anhydrous sodium sulfate and filter the mixture through 'Celite'. Remove the solvent and dissolve the crystalline residue in chloroform-ether (1:5; 30 cc.) and filter through neutral alumina (8 g.) eluting with chloroform-ether (1:9; 100 cc.). Evaporate the solvent and crystallize the residue from hexane to obtain 13β-ethyl-17β-(acetoxyacetyl)gon-4-en-3-one (0.32 g.), M.P. 162–164°; infrared absorption peaks at 5.71, 5.8, 5.98, 6.16μ.

Shake the above acetoxyacetylgon-4-en-3-one (0.65 g.) in ethanol (50 cc.) with pre-hydrogenated 2% palladized calcium carbonate (0.6 g.) in ethanol (10 cc.) at atmospheric pressure in an atmosphere of hydrogen until one molecular equivalent of hydrogen has been absorbed (5 minutes). Remove the catalyst by filtration and evaporate the filtrate to obtain a gum the title compound in admixture with its 5β-isomer. Dissolve the gum in benzene-hexane (1:1) and absorb onto a column of neutral alumina (30 g.). Elute the column with benzene-hexane (1:1), then with mixtures containing increasing portions of benzene, and finally with benzene-ether mixtures. Recrystallize the solid fractions obtained by elution with benzene-20% ether (0.07 g.) from acetone-hexane to obtain the title compound (0.02 g.), M.P. 111–113°; infrared absorption peaks at 5.72, 5.81, 8.20μ.

Analysis for $C_{23}H_{34}O_3$.—Calculated: C, 73.76; H, 8.97%. Found: C, 73.95; H, 9.28%.

EXAMPLE 49

13β-ethyl-17β-hemisuccinoyloxyacetyl-5β-gonan-3-one, sodium salt
and
13β-ethyl-17β-hemisuccinoyloxyacetylgonan-3-one, sodium salt To a stirred solution of 17β-acetoxyacetyl-13β-ethylgon-4-en-3-one (0.5 g.) in methanol (250 cc.) in a nitrogen atmosphere add potassium bicarbonate (1.0 g.) in water (150 cc.). Stir the mixture for 16 hours, extract with chloroform and wash the organic solution with brine and water, and dry. Evaporate the solvent and recrystallize the residue from ether to obtain 17β-hydroxyacetyl-13β-ethylgon-4-en-3-one (0.27 g.), M.P. 110–112°. Recrystallize from ether-hexane to obtain material, M.P. 113–114°; infrared absorption peaks at 3.05, 5.85, 6.04, 6.21μ; ultraviolet absorption maximum 242 mμ (ε 18,000).

Analysis for $C_{21}H_{30}O_3$.—Calculated: C, 76.32; H, 9.15%. Found: C, 76.55; H, 9.46%.

Allow the above hydroxyacetylgon-4-en-3-one (0.27 g.) to stand in pyridine (5.0 cc.) with recrystallized succinic anhydride (0.3 g.) for 48 hours in an atmosphere of nitrogen and then pour into ice, dilute with water and acidify with 10% hydrochloric acid. Allow to stand, filter the precipitate, wash with water and dry under reduced pressure to obtain 17β-hemisuccinoyloxyacetyl-13β-ethylgon-4-en-3-one (0.31 g.), M.P. 195–198°. Recrystallize from acetone-hexane to obtain material, M.P. 200–204°; infrared absorption peaks at 3.0, 5.58, 6.07μ; ultraviolet absorption maximum at 242 mμ (ε 17,600).

Analysis for $C_{25}H_{34}O_6$.—Calculated: C, 69.74; H, 7.96%. Found: C, 69.54; H, 7.62%.

Suspend 13β-ethyl-17β-hemisuccinoyloxyacetylgon-4-en-3-one (0.625 g.) in 95% ethanol (30 cc.) and titrate with aqueous 0.1 N sodium hydroxide using a phenolphthalein indicator until the solution becomes neutral. Add ethanol (10 cc.) and shake the mixture with prehydrogenated 2% palladized calcium carbonate (0.6 g.) in ethanol (5.0 cc.) in an atmosphere of hydrogen at atmospheric pressure until hydrogen uptake ceases (ca. 10 minutes, when one molecular equivalent of hydrogen will have been absorbed). Filter the catalyst, concentrate the filtrate at 50°, dilute with water and lyophilize to a fine powder. Wash with ether and dry to obtain a mixture of the title compounds (0.6 g.), M.P. 115–140°; infrared absorption peaks at 5.75, 5.89, 6.35μ.

The subject matter which the applicants regard as their invention is particularly pointed out and distinctly claimed as follows:

1. A compound of the structure

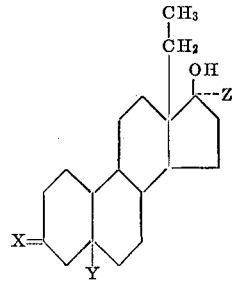

wherein

X is oxo, ethylenedioxy, or α-hydrogen and β-hydroxy,
Y is α- or β-hydrogen,
Z is ethyl, ethynyl, or chloroethynyl.

2. The compound of claim 1 wherein X is oxo, Y is β-hydrogen, and Z is chloroethynyl.

3. The compound of claim 1 wherein X is oxo and Z is chloroethynyl.

4. The compound of claim 1 wherein X is ethylenedioxy and Z is ethynyl.

5. The compound of claim 1 wherein X is ethylenedioxy, Y is α-hydrogen, and Z is ethynyl.

6. The compound of claim 1 wherein X is oxo and Z is ethynyl.

7. The compound of claim 1 wherein X is oxo and Z is ethyl.

8. The compound of claim 1 wherein X is oxo, Y is β-hydrogen, and Z is ethyl.

9. The compound of claim 1 wherein X is α-hydrogen and β-hydroxy and Z is ethyl.

10. The compound of claim 1 wherein X is α-hydrogen and β-hydroxy, Y is β-hydrogen, and Z is ethyl.

11. 13-ethyl-3-oxo-5β-gonane-17β-carboxylic acid.
12. 13β-ethyl-17β-acetoxyacetyl-5β-gonan-3-one.
13. 13β-ethyl-17β-hydroxyacetyl-5β-gonan-3-one.
14. 13β-ethyl-17β-hemisuccinoyloxyacetyl-5β-gonan-3-one.
15. 13β-ethyl-17β-acetoxyacetylgonan-3-one.

References Cited

UNITED STATES PATENTS

| | | | |
|---|---|---|---|
| 2,820,737 | 1/1958 | Laubach | 167—52 |
| 2,874,154 | 2/1959 | Stork et al. | 260—239.55 |
| 2,930,791 | 3/1960 | Meister et al. | 260—239.57 |

OTHER REFERENCES

Applezweig—Steroid, Drugs, p. 511–512, (1962). McGraw-Hill Book Co., N.Y.

HENRY A. FRENCH, Primary Examiner

U.S. Cl. X.R.

260—397.1, 397.3, 397.4, 397.5, 397.47, 999